(12) United States Patent
Scherzer et al.

(10) Patent No.: US 6,901,062 B2
(45) Date of Patent: May 31, 2005

(54) ADAPTIVE ANTENNA ARRAY WIRELESS DATA ACCESS POINT

(75) Inventors: Shimon B. Scherzer, Sunnyvale, CA (US); Piu Bill Wong, Monte Sereno, CA (US)

(73) Assignee: Kathrein-Werke KG, Rosenheim (DE)

( * ) Notice: Subject to any disclaimer, the term of this patent is extended or adjusted under 35 U.S.C. 154(b) by 824 days.

(21) Appl. No.: 09/727,226

(22) Filed: Nov. 30, 2000

(65) Prior Publication Data

US 2001/0031647 A1 Oct. 18, 2001

Related U.S. Application Data

(60) Provisional application No. 60/168,367, filed on Dec. 1, 1999.

(51) Int. Cl.[7] .............................................. H04B 7/216
(52) U.S. Cl. ...................... 370/335; 370/328; 342/375; 342/372; 342/165; 455/562.1; 455/440; 455/137
(58) Field of Search ............................. 455/562.1, 440, 455/132; 320/335, 328; 342/325, 372, 836, 165

(56) References Cited

U.S. PATENT DOCUMENTS

| | | | |
|---|---|---|---|
| 5,289,499 A | | 2/1994 | Weerackody |
| 5,294,939 A | * | 3/1994 | Sanford et al. ............. 343/836 |
| 5,471,647 A | | 11/1995 | Gerlach et al. |
| 5,563,610 A | * | 10/1996 | Reudink ..................... 342/375 |
| 5,615,409 A | * | 3/1997 | Forssen et al. ............. 455/440 |
| 5,721,554 A | * | 2/1998 | Hall et al. .................. 342/165 |
| 6,104,343 A | * | 8/2000 | Brookner et al. ........... 342/372 |
| 6,108,565 A | * | 8/2000 | Scherzer ................. 455/562.1 |
| 6,137,785 A | * | 10/2000 | Bar-Ness .................... 370/328 |
| 6,167,243 A | * | 12/2000 | Wang et al. ................ 455/137 |
| 6,347,234 B1 | * | 2/2002 | Scherzer ................. 455/562.1 |
| 6,385,181 B1 | * | 5/2002 | Tsutsui et al. .............. 370/335 |

FOREIGN PATENT DOCUMENTS

| | | |
|---|---|---|
| EP | 0 755 127 A2 | 1/1997 |
| GB | 2 313 237 A | 11/1997 |

OTHER PUBLICATIONS

U.S. Appl. No. 09/229,482, filed Jan. 13, 1999, Scherzer.
U.S. Appl. No. 09/310,567, filed May 12, 1999, Friedlander et al.
U.S. Appl. No. 09/511,665, filed Feb. 23, 2000, Wong et al.
U.S. Appl. No. 09/672,175, filed Sep. 27, 2000, Wong et al.
U.S. Appl. No. 60/168,367, filed Dec. 1, 1999, Scherzer et al.

* cited by examiner

*Primary Examiner*—David Hudspeth
*Assistant Examiner*—David Q Nguyen
(74) *Attorney, Agent, or Firm*—Fulbright & Jaworski LLP (57) ABSTRACT

The invention provides systems and methods for providing improved wireless data communication. Preferred embodiments of the present invention utilize multiple antenna beams in the forward link to provide increased forward link capacity and/or improved forward link signal quality. Multiple orthogonal sub-pilots are transmitted from a plurality of antenna elements for use in determining forward link channel characteristics according to a preferred embodiment. Forward link channel estimates may then be made by the preferred embodiment subscriber units and provided in a reverse link control channel to the corresponding base station. Multiple beams may also be utilized in the reverse link to provide increased reverse link capacity, such as for use in providing feedback of forward link channel estimates.

30 Claims, 5 Drawing Sheets

ADAPTIVE ANTENNA ARRAY WIRELESS DATA ACCESS POINT

RELATED APPLICATIONS

The present application is related to co-pending U.S. provisional patent application Ser. No. 60/168,367 entitled "Adaptive Antenna Array Wireless Data Access Point," filed Dec. 1, 1999, to which the benefit of priority of filing is hereby claimed and the disclosure of which is hereby incorporated herein by reference.

The present application is also related to co-pending and commonly assigned U.S. patent application Ser. No. 09/310,567 entitled "Manifold Assisted Channel Estimation and Demodulation for CDMA Systems in Fast Fading Environments," filed May 12, 1999, U.S. patent application Ser. No. 09/511,665 entitled "Transmitting Beam Forming in Smart Antenna Array Systems", filed Feb. 23, 2000, U.S. patent application Ser. No. 09/672,175, "Methods of Phase Recovery in Cellular Communication Systems", and U.S. patent application Ser. No. 09/229,482 entitled "Practical Space-Time Radio Method for CDMA Communication Capacity Enhancement," filed Jan. 13, 1999, which is a continuation-in-part of U.S. patent application Ser. No. 08/929,638, now U.S. Pat. No. 6,108,565, entitled "Practical Space-Time Radio Method for CDMA Communication Capacity Enhancement," filed Sep. 19, 1997, the disclosures of which are hereby incorporated herein by reference.

TECHNICAL FIELD

The invention relates generally to wireless communications and, more particularly, to forward link beam forming techniques.

BACKGROUND

Wireless communications have become widely used to provide communication of various types of information, including both voice and data information. Accordingly, there is often limited wireless spectrum availability for any particular service provider and/or any particular subscriber. Therefore, it is often important to efficiently communicate information between service providers and their subscribers both to provide subscribers with the information bandwidth they need/desire as well as to allow various service providers to provide services to a reasonably large number of individual subscribers.

Information communication in such wireless communication systems is limited by various factors. For example, cellular system capacity is almost always limited by inter and intra cell interference. In code division multiple access systems, inter-cell interference is usually a dominant factor. Accordingly, it can be appreciated that a simple increase in transmission power will often be insufficient to increase system capacity. Moreover temporal processing such as coding, data compression (such as may be particularly useful in voice communication), and diversity can provide capacity increases only to a limited extent, which in many communications systems today have been substantially reached. Accordingly, system configurations which provide interference reduction, thereby allowing an increase in capacity, are desirable.

In some predominately data communication systems forward link (or downlink) bandwidth substantially limits capacity. For example, in wireless communication systems providing Internet or similar access, forward link bandwidth is often saturated with large volumes of data being provided by the network to the subscribers while the reverse link (or uplink) carries comparatively little data. Accordingly, in such systems the forward link may present a bottleneck.

For example, a personal digital assistant (PDA), such as a PALM PILOT available from Palm Computing or an IPAQ available from Compaq Computer Corporation, may be utilized with a wireless modem to provide a subscriber with mobile Internet or other data access. Using such a wireless system, a subscriber may be traveling and, desiring information with respect to particular types of restaurants near by, may access the PDA for relevant information. Accordingly, by providing relatively little information in the reverse link, such as a present location and a type of restaurant desired, a large amount of data may be returned in the forward link, such as a list of all nearby restaurants meeting the parameters in addition to directions to the restaurants, the hours of operation of the restaurants, and/or bills of fare for the identified restaurants.

Therefore, should be appreciated that in network systems the required capacity is often not a function of the number of potential subscribers, but instead the data capacity requirements may be virtually unlimited. This conclusion is particularly valid in light of recent situations where Internet service providers (ISP) have provided higher data throughput which is very quickly consumed by existing subscribers. Accordingly, system configurations which increase forward link capacity in such systems, such as may be provided at least in part through interference reduction, are desirable.

Wireline solutions which addresses the asymmetric behavior of such data communications include cable modems and asymmetrical digital subscriber line (ADSL). For example, a cable modem system provides bandwidth on the order of 2 to 3 megabits per second in the downlink with only about 120 kilobits per second on the uplink.

Wireless solutions have also been developed to address asymmetric data communications, such as the CDMA2000 1xEV (or high data rate (HDR)) specification for code division multiple access (CDMA) developed by Qualcomm. According to this specification optimization of the forward link is attempted through the subscriber units monitoring a common pilot signal being broadcast from the base station (typically provided for handoff determinations between sectors and/or cells of the communication network) and providing information regarding this common pilot to the base station in the reverse link. More specifically, according to the HDR standard, each subscriber unit will monitor a common pilot being broadcast throughout the whole sector by the base station and each subscriber unit gradually sends back the quality or receive strength of the common pilot signal to the base station. Accordingly, each subscriber unit will periodically report the strength of the common pilot as received by that subscriber unit. Using this information, the HDR base station may determine the particular subscriber units currently in a position most likely to be suitable for high data rate transmission in the forward link, i.e., the subscriber units reporting a strong common pilot signal may be provided with high data rate transmissions while the remaining subscriber units may be passed over for a subsequent epoch when they are reporting a strong common pilot signal.

As can be appreciated from the above discussion, the forward link of the described HDR specification results in a time division multiple access (TDMA) sharing of a single wide sector beam in the forward link. Accordingly, one or more of the subscriber units may be provided high data rate transmission in the forward link while other ones of the subscriber units in the same sector are provided no forward link data transmission. However, because data delivery is typically less time critical than voice data, the latency (sometimes on the order of several seconds) of this solution is often acceptable, although undesired.

A need therefore exists in the art for systems and methods which are adapted to provide high bandwidths and/or high data rates in the forward link of wireless communication systems. A further need exists in the art for systems and methods which provide high bandwidths and/or high data rates while optimizing utilization of available spectrum. A still further need exists in the art for systems and methods providing high bandwidths and/or high data rates to minimize data communication latencies associated therewith.

SUMMARY OF THE INVENTION

The present invention is directed to a system and method which utilizes forward link beam forming techniques to increase forward link capacity and/or signal quality. According to a preferred embodiment of the present invention multiple antennas or antenna elements are utilized in the forward link to derive channel estimation information useful in forming antenna beams for subscriber units in communication therewith. Preferred embodiments of the present invention are utilized in base station to mobile subscriber unit communications, such as those associated with a cellular or personal communication system (PCS) network base station to mobile unit. However, it should be appreciated that the concepts of the present invention may be applied to any number of wireless communication systems.

A preferred embodiment of the present invention utilizes an antenna array of M spaced apart antenna elements, most preferably M spaced apart columns of antenna elements, to transmit orthogonal pilot signals, or other signals useful in determining spatial information, to subscriber units. For example, according to a most preferred embodiment, a common pilot signal may be Walsh coded for independent transmission at each of the M antenna elements of a base station sector array. Thereafter, subscriber units in communication with the base station sector array may correlate the Walsh code of the coded pilot signal, as provided by all or a plurality of the M antenna elements, and thereby provide estimates of the forward link channel useful in forward link beam forming. The forward link channel information may be provided by the subscriber unit to the base station for use in forward link beam forming at the base station.

Various communication systems which may be adapted according to the present invention may implement a protocol which is not symmetrical. For example, an uplink frequency may be utilized which is different than a downlink frequency, such as in IS-95 cellular communications where the uplink and downlink frequencies differ by 60 MHZ or more. This difference in frequencies generally cause the uplink and downlink channels to be non-correlated. Accordingly, the angle of arrival and/or the time of arrival of the uplink and downlink channels, although statistically similar, may differ significantly. Accordingly, the use of downlink pilot signals according to the present invention in estimating a downlink channel and forming a downlink antenna beam assures that the channel estimation does not suffer from the effects of non-correlation of the uplink and downlink channels.

According to a most preferred embodiment of the invention, the forward link channel information is provided to a base station through the reverse link which, in many scenarios, does not experience demand for user payload capacity as great as that of the forward link. Accordingly, an existing resource (the reverse link) which may not be utilized to capacity may be relied upon in increasing capacity of an often over utilized resource (the forward link).

It should be appreciated that use of a pilot signal coded to provide multiple orthogonal signals transmitted by a plurality of antenna elements according to the present invention provides diversity in the forward link with respect to the pilot signal. Accordingly, a subscriber unit which is located in a deep fade with respect to the pilot signal as transmitted from one or more of the antenna elements is unlikely to be disposed in a deep fade with respect to the pilot signal as transmitted from all of the antenna elements. The channel information provided by the subscriber unit to the base station will preferably be utilized in beam forming of a traffic channel in order to avoid or mitigate multipaths associated with the aforementioned deep fades, or other causes of poor signal reception, and/or to achieve a strong, or otherwise desirable traffic signal as may have been associated with one or more of the diverse renditions of the pilot signal.

Accordingly, using the forward link channel information provided by the subscriber unit, a base station may provide narrow beams in the forward link for use by respective ones of the subscriber units. However, it should be appreciated that the pilot signals of a number of communication systems are utilized for purposes other than handoff determinations between sectors and/or cells of the communication network, such as for providing phase information with respect to a traffic channel. For example, where multiple bits are communicated per symbol, such as where phase shift keying (PSK) or quadrature amplitude modulation (QAM) is utilized, the pilot signal may be utilized in demodulating traffic channels. However, if the pilot signal and the traffic channel as received by the subscriber unit are out of phase demodulation errors may occur and/or data throughput may be diminished.

A preferred embodiment of the present invention utilizes the above described forward link channel information and/or beam forming techniques to phase match the pilot signal as radiated in a broad beam to the traffic channel as radiated in a more narrow beam. For example, the forward link channel information determined by the subscriber unit may be utilized by the subscriber unit in deriving a composite pilot signal, from the M coded pilot signals, useful in demodulating a traffic signal transmitted using the aforementioned beam forming at the base station. Additionally or alternatively, the antenna beams' coefficients may be calculated to achieve identical wave-fronts between the pilot and the traffic signals, such as may be facilitated using beam synthesis based on a minimum root means square approach. Preferred embodiments of phase matching radiation patterns associated with a pilot signal and a traffic signal are shown and described in the above referenced patent application entitled "Practical Space-Time Radio Method for CDMA Communication Capacity Enhancement" and "Method so Phase Recovery in Cellular Communication Systems," the disclosures of which have been incorporated herein by reference.

It is expected that as mobile data services become more ubiquitous, the future of such services depends on the ability of service providers to offer low cost subscription plans which, in a highly competitive market, can only be practically achieved through optimizing available capacity among a large number of subscribers. It is therefore believed that mobile data services are an excellent candidate for the adaptive array technology of the present invention. Embedding this technology into service providers' infrastructure could provide vary significant capacity increases through the ability to eliminate same cell interference for simultaneously served subscribers, reduction of inter-cell interference, and increasing signal to noise ratio of the intended subscriber and hence increase the user data rate, resulting in either higher throughout, the ability to support many more subscribers for a given infrastructure, or some combination thereof.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

DETAILED DESCRIPTION

In providing wireless communications, focusing energy in the direction of a receiving system, such as a subscriber unit in a cellular system, typically reduces the amount of power needed in order to maintain a given service quality. Accordingly, the use of relatively narrow antenna beams to focus energy in wireless communications both operates to increase signal quality at an intended receiver unit as well as to limit interfering energy experienced at an unintended receiver unit.

An array of antenna elements may be utilized to focus power received from a subscriber unit to the base station receiver (reverse or up link) and power transmitted to a subscriber unit by the base station transmitter (forward or down link). For example, phased arrays having circuitry coupled thereto to provide adaptive signal processing, e.g., adaptive beam forming, may be utilized to provide relatively narrow antenna beams focusing energy of signals communicated between a base station and an associated subscriber unit.

Preferred embodiments of the present invention utilizing adaptive signal processing techniques to enhance wireless communications, such as to provide increased capacity and/or increased signal quality, are described herein with reference to an air interface based on code division multiple access (CDMA) (e.g., IS-95, G3-cdma2000, W-CDMA) wherein data transfer is asymmetrical (e.g., more data is transmitted in the downlink than in the uplink). Furthermore, ones of the embodiments described herein assume that the information processing systems utilizing the wireless communications can tolerate data delivery delays, such as on the order of several seconds, and/or data transmission is "bursty" with an instantaneous high data rate. However, it should be appreciated that the present invention is not restricted to use with the above parameters. For example, the concepts of the present invention may be applied to various air-interfaces, such as time division multiple access (TDMA), frequency division multiple access (FDMA), and/or CDMA.

Communication systems operating according to the present invention may utilize multiple beams in the reverse link to focus the energy associated with a particular subscriber unit and isolate a signal associated therewith from other radiated energy, whether other subscriber units, other base stations of a network, or even non-network related sources of energy. For example, a RAKE receiver may be utilized in the reverse link to combine signals of a particular subscriber unit separated in time to provide an acceptable receive signal quality. By adding a space dimension to the RAKE receiver through the use of multiple directional beams, a space/time RAKE receiver may be implemented which further isolates a particular subscriber unit's signal to provide improved receive signal quality and, therefore, allows for increased capacity on the reverse link. This approach assumes that the transmission channel used has specular characteristics in both time and space. This assumption has been shown to be valid in current IS-95 operation.

Implementation of space/time searching and tracking in the system above may utilize angle of arrival (AOA) and/or time of arrival (TOA) estimation methods. The particular methods implemented may be dependent upon the air interface selected. Generally, air interfaces can be sorted between pilot assisted reverse link (coherent demodulation) and non-pilot reverse link (non-coherent demodulation). Non-pilot reverse link (e.g., IS-95) channel estimation is shown and described in the above referenced patent application entitled "Practical Space-Time Radio Method for CDMA Communication Capacity Enhancement" and U.S. Pat. No. 6,108,565 also entitled "Practical Space-Time Radio Method for CDMA Communication Capacity Enhancement," previously incorporated herein by reference. Pilot assisted channel estimation methods are shown and described in the above referenced patent application entitled "Manifold Assisted Channel Estimation and Demodulation for CDMA Systems in Fast Fading Environments," previously incorporated herein by reference. Both of the above methods capitalize on the specular structure of the channel to provide a simple, low bit count, technique that can preferably be implemented on an application specific integrated circuit (ASIC). As a result, a tremendous amount of processing power may be added to a communication system, such as at the base station, for a very moderate cost. This processing power may be distributed among the base station channel elements by adding logic into otherwise substantially conventional modems, by adding companion chips to otherwise substantially conventional modems, or the like.

Implementation of space/time searching and tracking preferably utilizes a technique referred to herein as "heuristic data clustering" (HDC). Unlike more traditional beam assignment techniques, the HDC process of the preferred embodiment is based upon pattern recognition. For example, a preferred embodiment HDC process uses fast accumulation of multipath angle of arrival (AOA), time of arrival (TOA) and/or strength data points to form a data cluster. Preferably various filtering techniques are used to suppress clutter in the cluster. From the data cluster known data patterns are preferably identified and quantified to resolve best expected AOA and/or TOA for the multipath conditions experienced. Embodiments of a HDC process are shown and described in above referenced U.S. Pat. No. 6,108,565 entitled "Practical Space-Time Radio Method for CDMA Communication Capacity Enhancement," previously incorporated herein by reference.

Figure 1A:
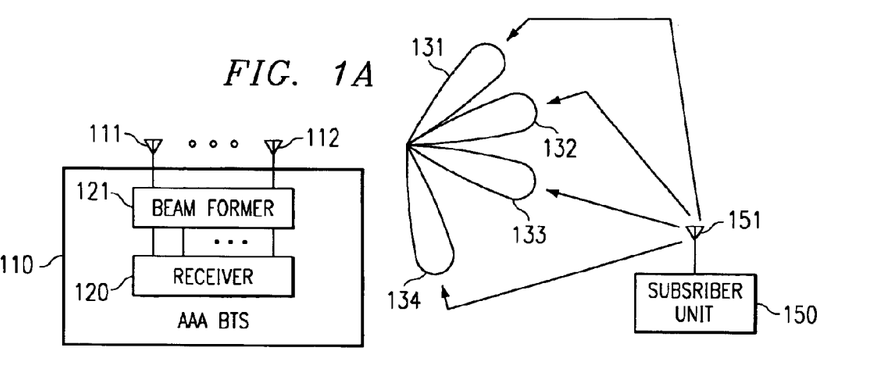
FIGS. 1A and 1B show reverse link beam forming according to a preferred embodiment of the present invention.

Directing attention to FIGURE 1A, a reverse link beam forming scenario is illustrated with respect to base transceiver station (BTS) 110 and subscriber unit 150. Specifically, receiver 120 of BTS 110 is coupled to antennas 111 and 112 through beam former 121 providing multiple adaptive beams in the receive path. Although only a single BTS receiver is illustrated, it should be appreciated that BTS 110 may include a plurality of such receivers, or otherwise be adapted to communicate with a plurality of subscriber units, as is common in cellular type base stations. Similarly, it should be appreciated that only 2 antenna elements are illustrated in order to better simplify the discussion of the concepts of the present invention. However, an antenna array utilized in providing beam forming according to the present invention may utilize more than the 2 antenna elements (or columns) illustrated, such as 4, 8, 12, or 16 antenna element columns depending upon the antenna aperture desired and/or how narrow of antenna beams are desired to be formed. Moreover, although illustrated as single antennas, it should be appreciated that preferred embodiments of antennas 111 and 112 may each include an array of antenna elements, such as a column of dipole antenna elements.

It should be appreciated that the antenna elements utilized according to the present invention may be deployed in various configurations useful in beam forming as discussed herein. For example, the antenna elements may be disposed in a planar phased array configuration, such as are well known in the art. Alternatively, the antenna elements may be disposed in a circular or conical phased array configuration, such as shown and described in commonly assigned U.S. Pat. No. 5,940,048 entitled Conical Omni-Directional Coverage Multibeam Antenna, the disclosure of which is hereby incorporated herein by reference.

Beam former 121 may be any circuitry suitable for providing desired combining of signals of antennas 111 and 112 according to the present invention. For example, beam former 121 may comprise circuitry for combining signals received at a plurality of the antenna elements of the array using a complex weighting technique which may include phase and/or amplitude adjustment of one or more of the signals to be combined in beam forming, such as may be provided by digital signal processing (DSP), controllable phase shifters, controllable attenuators, controllable amplifiers, and other signal manipulation circuitry and combinations thereof. Accordingly, it should be appreciated that beam former 121 may include control circuitry, such as may be provided by a central processing unit operating under control of an instruction set defining operation as described herein, which may be coupled to various system components and/or signal paths in order to monitor communication of signals and/or other system operations and provide control signals in response thereto. Additionally or alternatively, control circuitry (not shown) may be provided external to beam former 121, such as a BTS controller disposed within BTS 110 or a cell cluster controller disposed in a network of BTSs, to provide monitoring and/or control of various aspects of wireless communications.

In the preferred embodiment operation of FIG. 1A, the most probable multipath directions of a signal transmitted by subscriber unit antenna 151 are determined, such as through operation of a controller (not shown) coupled to the antenna signal paths of BTS 110 and/or beam former 121, and, accordingly, beam former 121 may form directional antenna beams 131–134 to receive a signal from subscriber unit 150 as it arrives at BTS 110 through various ones of the multipaths.

Figure 1B:
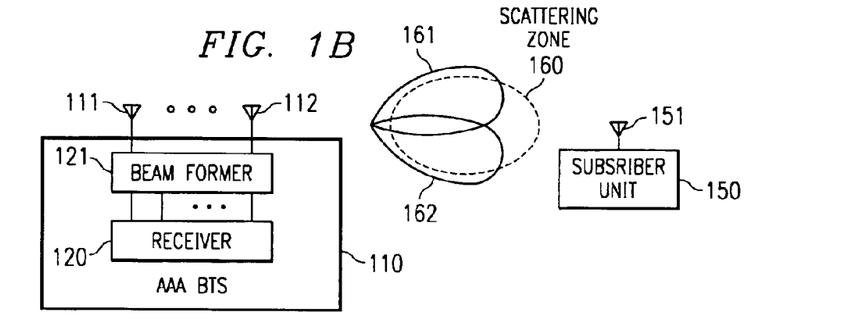

Reverse link beam forming using the systems of FIG. 1A is shown in FIG. 1B where only a single scattering area is present. Specifically subscriber unit 150 may be disposed within scattering zone 160, or scattering zone 160 may be disposed between subscriber unit 150 and BTS 110, resulting in substantially no clearly non-correlated multipaths. Accordingly, in this scenario the preferred embodiment provides multiple partially overlapping beams from antennas 111 and 112 to receive signals transmitted from subscriber unit 150.

In operation according to the preferred embodiment, each receive beam is assigned to a different finger of a RAKE receiver, such as where receiver 120 is a RAKE receiver. Accordingly, in this embodiment the number of antenna beams depends on the number of available RAKE fingers. This beam forming strategy results in a very robust reverse link where each beam orientation is a result of sufficient integration, preferably using HDC techniques as described above, while capitalizing on the multiple demodulation "fingers" for diversity. Of course different numbers of antenna beams may be utilized, if desired. For example, where there are fewer substantially uncorrelated receive signals than the number of RAKE fingers, the number of antenna beams might not correspond to the number of RAKE fingers and instead correspond to another metric, such as the number of multipaths identifiable or even an arbitrary or predetermined number of antenna beams.

It should be appreciated that forward link communications in wireless communication systems can take various approaches. For example, in an implementation where subscribers are served using single data stream, on time division base, a single base station transmission (Tx) beam might be utilized to serve all such subscribers. However, in such an implementation, the effective radiated power (ERP) is always maximized in the direction of the served subscriber utilizing all available base station power. Alternatively, base station power may distributed among several subscribers through the use of multiple beams. Accordingly, where the subscribers are spatially separated, focusing subscriber associated transmitted data at the served subscriber minimizes the power of this signal at the other simultaneously served subscribers.

Forward link beam forming may, therefore, be utilized to maximize signal to interference plus thermal noise conditions at subscriber units. Forward link beam forming according to the preferred embodiment of the present invention provides for both coherent and diversity gains in the forward link, while eliminating interference to other subscribers that are simultaneously served. When the fading rate associated with a particular subscriber unit increases to a point where sufficient tracking is not possible, the preferred embodiment of the present invention maintains coherent gain and interference reduction functionality.

High rate spatial channel estimation periodically or continuously performed at the subscriber units according to the present invention may be utilized in forward link beam forming. Preferably, reverse link communications are enhanced or optimized, such as described above with respect to FIGS. 1A and 1B, and, therefore, provide sufficient capacity in the reverse link for communication of channel estimation data between subscriber units and an associated base station. Accordingly, increased capacity in the reverse link may be utilized, at least in part, according to the present invention for increasing capacity in the forward link. For example, if reverse link capacity is increased, such as by three or four times, this increased reverse link capacity, or a portion thereof, may be utilized for channel estimation feedback according to the present invention to provide maximum ratio combining beam forming in the forward link.

It should be appreciated that advantages of the use of forward link beam forming according to the present invention include the ability to maintain a plurality of parallel data streams (transmissions), providing forward link diversity, and the ability to use a single antenna array for transmit and receive signals. For example, by implementing forward link beam forming according to the present invention it is possible, since subscriber units provide spatial signature information, for the communication system to group the subscriber units into a number of groups (e.g., M groups) and transmit to one subscriber unit of each group while "nulling" the energy of a signal transmitted to a subscriber unit of one group in the direction of the other concurrently served subscriber units from the M groups. This implementation provides forward link capacity increase by a factor of M over that of the time divided HDR forward link discussed above. Moreover, since accurate beam forming allows 1/M transmit power to be used for the same ERP result at the appropriate subscriber unit, the same amount of power used for one BTS may continue to be utilized in this increased capacity embodiment, i.e., the increased capacity is implemented to efficiently use BTS transmit power while maintaining substantially the same level of inter-cell interference.

In addition to the ability to maintain a plurality of parallel data streams as described above, forward link beam forming according to the present invention preferably provides forward link diversity through the use of maximum ratio combining for appropriate subscriber units. For example, with low mobility subscribers, which are expected to be very prevalent in high volume data communication sessions, added diversity associated with the use of maximum ratio combining will be substantial, e.g., where four antenna elements are well spaced in the array and utilized with maximum ratio combining, advantages of 3 to 6 dB are likely to be realized.

Additionally, the use of forward link beam forming according to preferred embodiments of the present invention provides accurate estimation of the forward link channel. Accordingly, there is no need to "widen" the transmit beam, such as is common in systems where forward link channel estimation is based upon reverse link statistics, to accommodate inaccuracies in the forward link estimation. Therefore, a single, wide aperture antenna array may be utilized to provide beam forming in both the forward and reverse links according to the present invention.

Figure 2:
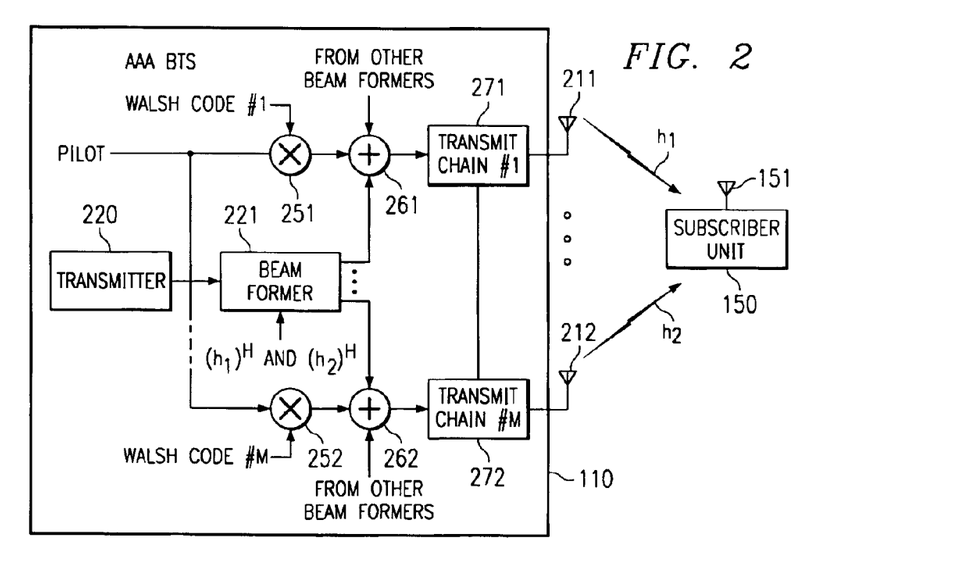
FIG. 2 shows a base station adapted to provide forward link beam forming according to a preferred embodiment of the present invention.

Directing attention to FIG. 2, a preferred embodiment of a system adapted to provide forward link beam forming according to the present invention is shown. Specifically, BTS 110 is shown to include transmitter 220 coupled to antennas 211 and 212 through beam former 221. As with receiver 120 discussed above, although only a single BTS transmitter is illustrated, it should be appreciated that BTS 110 may include a plurality of such transmitters, or otherwise be adapted to communicate with a plurality of subscriber units, as is common in cellular type base stations. Also, as with antennas 111 and 112 discussed above, it should be appreciated that an antenna array utilized in providing beam forming according to the present invention may utilize more than the 2 antenna elements (or columns) illustrated, such as 4, 8, 12, or 16 antenna element columns depending upon the antenna aperture desired and/or how narrow of antenna beams are desired to be formed. Moreover, antennas 211 and 212 may be configured as discussed above with respect to antennas 111 and 112. Additionally or alternatively, the same antenna elements, whether antennas 111 and 112 or antennas 211 and 212 may be utilized in both the forward and reverse links according to the present invention, such as through the use of duplexers or diplexers coupling receiver 120 and transmitter 220 thereto.

Beam former 221 may be any circuitry suitable for providing desired manipulation of signals provided to antennas 211 and 212 according to the present invention. For example, beam former 221 may comprise circuitry for splitting a transmitter signal and providing complex weighting, which may include phase and/or amplitude adjustment, to the split signals for beam forming, such as may be provided by digital signal processing (DSP), controllable phase shifters, controllable attenuators, controllable amplifiers, and other signal manipulation circuitry and combinations thereof. Accordingly, it should be appreciated that beam former 221 may include control circuitry, such as may be provided by a central processing unit operating under control of an instruction set defining operation as described herein, which may be coupled to various system components and/or signal paths in order to monitor communication of signals and/or other system operations and provide control signals in response thereto. Additionally or alternatively, control circuitry (not shown) may be provided external to beam former 221, such as a BTS controller disposed within BTS 110 or a cell cluster controller disposed in a network of BTSs, to provide monitoring and/or control of various aspects of wireless communications.

In operation according to the preferred embodiment of the present invention, a BTS system pilot is "covered" or multiplied with M Walsh codes (providing M "sub-pilots") and added to the radio frequency (RF) chains, e.g. transmit chains 271 through 272, for transmission of a plurality of orthogonal or substantially uncorrelated pilot signals to the subscriber units. For example, a common pilot may be split, e.g., in phase power divided, into M sub-pilots. Accordingly, in the embodiment of FIG. 2, mixers 251 and 252 are utilized to code a pilot signal with a corresponding one of Walsh codes 1 through M for radiation by a corresponding antenna 211 through 212.

Preferably the number of orthogonal sub-pilots utilized according to the present invention corresponds to the number of antenna elements (such as the number of antenna element columns in a preferred embodiment) utilized in communicating with particular subscriber units. For example, where an antenna array includes 12 antenna element columns M may be selected to be 12. However, if only a subset of the antenna element columns are utilized for communications with particular subscriber units, such as where the 12 antenna element columns are associated with 3 panels of 4 antenna element columns each and each of the 3 panels is utilized to provide communications only within an associated sector, it may be desirable to select M to be less than the number of antenna elements, such as 4 to correspond to the number of antenna elements used in communicating with particular subscriber units. Alternatively, M may be selected to be other values which may or may not be associated with the number of antenna elements used, such as the number of transmitters used or available at a base station, a number corresponding to a receiver's ability to despread signals, or a number corresponding to the number of substantially uncorrelated signals a receiver is likely to receive in a particular environment, if desired.

It should be appreciated that transmitter 220 provides a traffic signal to corresponding beam former 221. The outputs of beam former 220 are coupled to antennas 211 through 212 to provide spatial combining of the output signals and result in the desired beam forming. Preferably, the beam former outputs associated with other transmitters of BTS 110 are summed for providing to the antennas, such as through combiners 261 through 262, each associated with a respective antenna 211 through 212. This preferred embodiment implementation provides for non-beam-formed sub-pilots while the traffic data streams transmitted to the subscriber units are beam-formed.

Subscriber units of the present invention may preferably estimate all M air sub-channels, or some portion thereof, to form $C_k M$ dimensional column vectors, where $C_k$ is the spatial channel signature, preferably including phase and amplitude information, for the $k^{th}$ subscriber unit. Preferably, each element of the $C_k M$ dimensional column vectors is the subpilot channel gain using the sub-pilots. Additionally, the subscriber units preferably calculate a time correlation function such as by utilizing the following equation:

$$Y_k = C_k(t)^H * C_k(t+\tau)/(abs(C_k(t)) * abs(C_k(t+\tau))); \quad (1)$$

where $(\ )^H$ is a transpose conjugate function, $\tau$ is the $C_k$ measurement interval, and abs( ) is an absolute value function. $Y_k$ is a metric to estimate C/I and Doppler conditions (which is referred to herein as the channel quality factor) and is utilized by the subscriber units to determine channel quality.

In a preferred embodiment of the present invention the subscriber units periodically or continuously provide spatial channel data, such as that which may be calculated using the formula above, to the base station. Using such spatial channel data, communication system control logic, such as control circuitry associated with beam former 221, may group the subscriber units $C_1$ through $C_n$ (where n is the number of subscriber units being served, such as within a sector or an omni-cell) into M groups (where each group of subscriber units may be sufficiently isolated from subscribers of the remaining groups to provide isolated and independent communications thereto, i.e., the groups are spatially orthogonal with respect to each other). For example, a preferred embodiment of the present invention identifies groups of subscriber units utilizing the following logic:

If $abs(C_1^H * C_2)/(abs(C_1) * abs(C_2)) < Q$, then $C_1$ and $C_2$ are identified with different groups; and  (2)

If $abs(C_1^H * C_2)/(abs(C_1) * abs(C_2)) >= Q$, then $C_1$ and $C_2$ are identified with the same group;  (3)

where Q is a spatial correlation threshold between two subscribers. Preferably Q is very small, such as on the order of approximately 0.1 to 0.2, or small enough that users will not substantially interfere with one another. The value of Q is preferably determined through simulation and/or field testing to find the correlation between users in an environment. Accordingly Q is preferably optimized for a particular environment.

Having identified M groups of subscriber units which may be independently served, a preferred embodiment of the control logic may select M subscriber units (one from each of the M groups) to be independently and simultaneously served by M transmit beams formed by beam former 221. Specifically, utilizing the spatial information provided by the subscriber units the control logic is able to determine groups of subscriber units which are disposed within the service area such that antenna beams may be formed which eliminate or mitigate mutual interference and, therefore, allow subscriber units of these groups to be served simultaneously with other ones of the subscriber units without substantially interfering. Accordingly, this preferred embodiment operation may be relied upon to provide improved signal quality, such as may be utilized in providing increased data rates, more robust communications, and the like.

Preferably, the channel quality factor discussed above is utilized according to the present invention to determine the sustainable data rate from the base station to the subscriber unit. For example a sustainable data rate may be determined according to the present invention by utilizing the following equation:

$$(Data\text{-}rate)_k = R_k + L * abs(Y_k); \quad (4)$$

where L may be a constant or a function, such as a function of $Y_k$, and $R_k$ may be set by long term measured frame error rate. L may be a scalar constant determined to provide a particular data rate with a particular channel quality factor $Y_k$. L may be a function of $Y_k$ such that a table look up function is provided to determine a desirable data rate for a particular channel quality factor $Y_k$. $R_k$ may be determined, for example, through the subscriber units continuously or periodically monitoring the forward link frame error rate and using this information, whether at the subscriber unit or at the base station, to determine a long term frame error rate. It should be appreciated that $R_k$ may be a positive or a negative value. Accordingly, the experienced error rate may be utilized to "fine tune" the data rate implemented for a particular channel quality factor $Y_k$.

Subscriber units selected for simultaneous service in the above embodiment are preferably selected based upon service priority metrics, such as to provide communications which do not exceed a maximum allowed latency, as well as through their association with the various above described groups. Accordingly, operation of this embodiment may be relied upon to provide desired levels of quality of service (QOS) while providing advantages of the present invention as described above.

Alternatively, the control logic operating according to the present invention may select a plurality of subscriber units of one or more of the M groups for simultaneous service. For example, where an increase in subscriber capacity is preferred over maximizing the data rate available to particular subscribers, control logic may select a plurality of subscriber units in each group for simultaneous communications, such as where orthogonal channel components, e.g., time division, code division, and/or frequency division channel components, are available for the selected plurality of subscriber units of the groups.

As discussed above, subscriber units operating according to preferred embodiments of the present invention continuously or periodically provide spatial channel information to the base station. According to the preferred embodiment, beam forming coefficients for each subscriber actively being served are established by the last (most recently updated) spatial channel signature that was provided by that subscriber unit. Alternatively, where system operation and/or environmental conditions are such that spatial channel determinations are prone to occurrences of anomalous spatial determinations or where subscriber units are low mobility, beam forming coefficients for subscribers may be established using multiple epochs of spatial channel signatures, such as a simple average or weighted average of spatial channel signatures, if desired.

Preferably, the beam forming coefficients utilized by the base station for any particular subscriber unit are determined by the conjugate of the spatial channel information provided by the corresponding subscriber unit. Accordingly, the forward link signal transmitted by the base station is specifically adapted to compensate for the forward link conditions experienced which will operate to cancel the effects of the forward link channel. For example, a single common pilot (CP) as transmitted by antennas 211 and 212 of BTS 110 is received at the subscriber unit 150 as a function of the forward link channel ($CP(h_1+h_2)$), wherein $h_1$ is the effect of the forward link channel as experienced by a signal propagating from antenna 211 and $h_2$ is the effect of the forward link channel as experienced by a signal propagating from antenna 212. However, utilizing the orthogonal pilots transmitted from each of the antennas according to the present invention, subscriber unit 150 can determine the forward link channel conditions $h_1$ and $h_2$, and provide this information to BTS 110. Using this spatial channel information, BTS 110 may adapt a traffic channel directed to subscriber unit 150 for this forward link channel by applying the conjugate of the forward link channel (e.g., the inverse of in-phase (I) and quadrature (Q) information provided by the subscriber unit) to the signal before its transmission into the forward link channel, e.g., $TS_{ant1}(h_1^*) \ldots TS_{antM}(h_2^*)$, where TS is a traffic signal, $TS_{ant1}$ is the traffic signal provided to a first antenna of the array, $TS_{antM}$ is the traffic signal provided to a $M^{th}$ antenna of the array, and $h_1^*$ and $h_2^*$ are the conjugates of $h_1$ and $h_2$ respectively. Accordingly, the traffic signal as received by subscriber unit 150 through the forward link channel will be the traffic signal substantially without the effects of the forward link channel, e.g., $TS(h_1 h_1^* + h_2 h_2^*)$ or TS. It should be appreciated that the traffic signal may be normalized according to this technique by selecting weighting of the channel conjugates used such that the power of the traffic signal when received through the forward link channel is at a predetermined level.

According to preferred embodiments of the present invention, subscriber units provide several operations on the forward link. Preferably these forward link subscriber unit operations include time search and track, spatial channel estimation, and demodulation.

Figure 3:
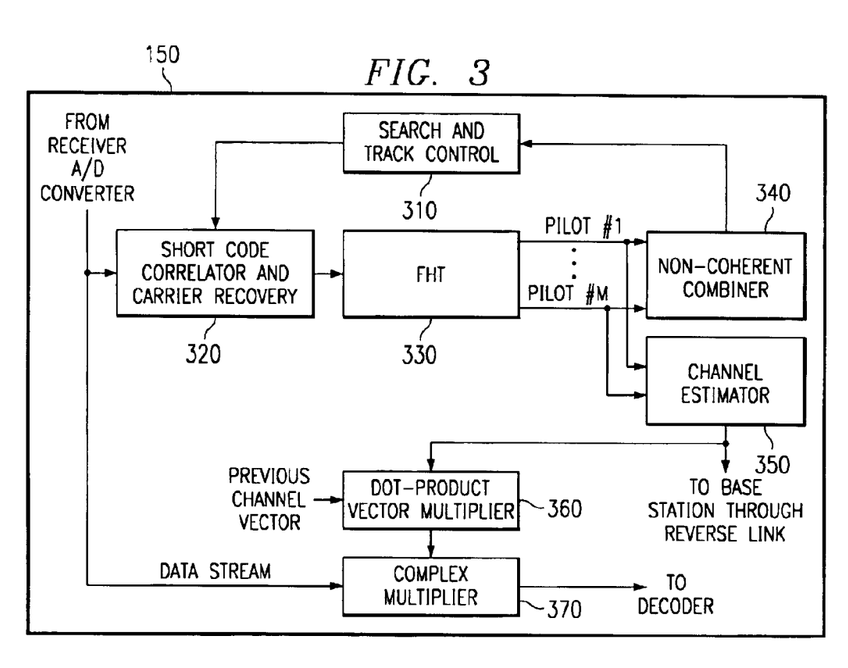
FIG. 3 shows a subscriber unit adapted to operate with forward link beam forming according to a preferred embodiment of the present invention.

Directing attention to FIG. 3, a block diagram of circuitry of subscriber unit 150 adapted to provide searching and tracking according to a preferred embodiment of the present invention is shown. The search and track operation of the preferred embodiment is somewhat similar to direct sequence spread spectrum receiver operation, such as IS-95 spread spectrum receiver operation. However, operation of search and tracking according to the preferred embodiment utilizes Fast Hadamard Transform (FHT) in addition to pseudo noise (PN) code multiplication. Accordingly, the output of correlator 320 is preferably provided to FHT unit 330. FHT unit 330 preferably extracts information with respect to the above described M sub-pilots. For example, a most preferred embodiment FHT unit 330 extracts power and phase information (e.g., in-phase (I) and quadrature (Q) information) for each of the M sub-pilots.

Preferably, the extracted sub-pilot information is non-coherently summed, e.g., a square and add operation may be performed on the sub-pilot amplitude information that is extracted from each despread sub-pilot signal, such as by non-coherent combiner 340, to provide metrics for the search and track circuit, such as search and track controller 310. Search and track controller 310 preferably searches the sub-pilot information provided by non-coherent combiner 340 to identify a point of highest correlation of the sub-pilot amplitudes and, thereafter, tracks this highest correlation as it changes over time. Accordingly, search and track controller 310 may determine time of arrival (TOA) information, such as may be provided to correlator 320.

Figure 4A:
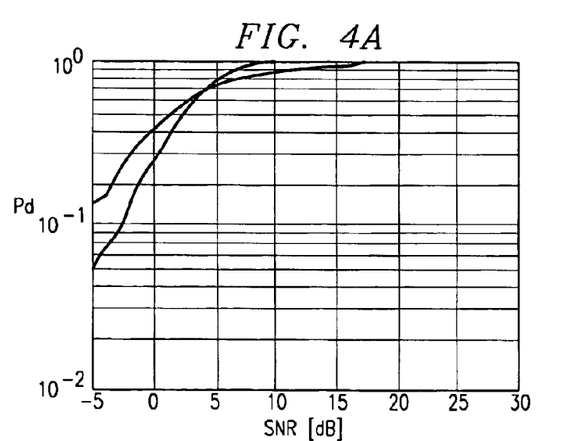
FIGS. 4A and 4B show graphs of pilot detection for multiple sub-pilots of a preferred embodiment of the present invention compared to a single pilot of a typical prior art system.
Figure 4B:
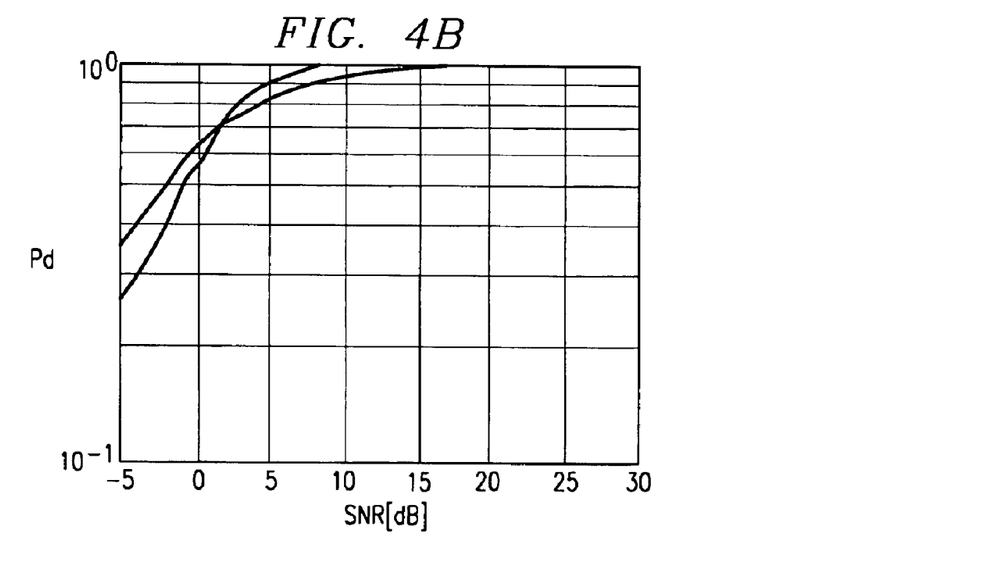
Figure 5A:
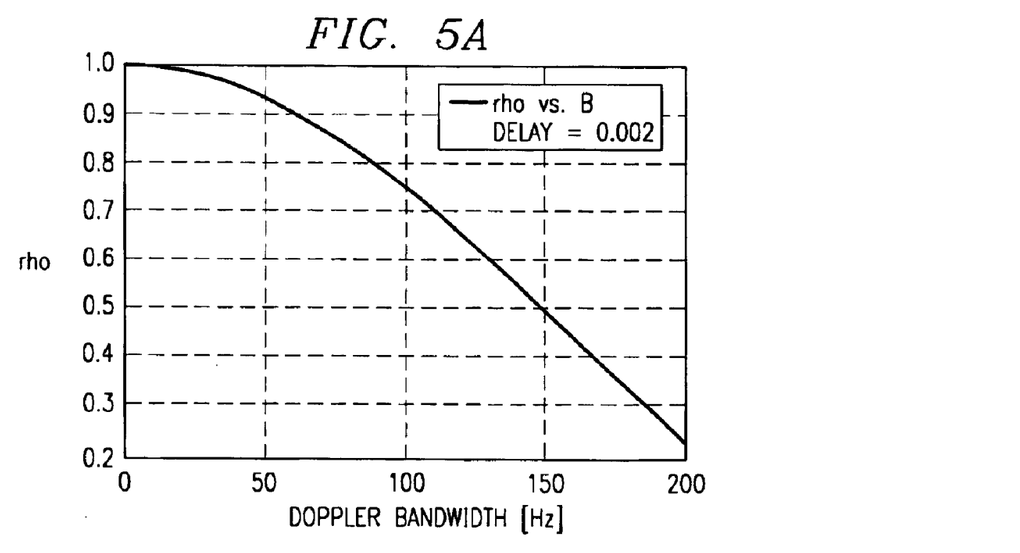
FIG. 5A shows correlation verses Doppler bandwidth of a preferred embodiment system of the present invention.
Figure 5B:
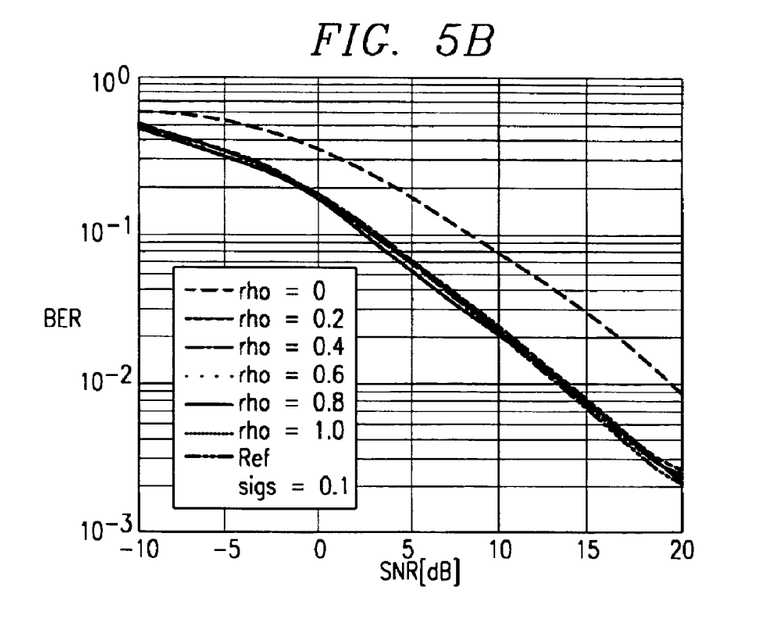
FIGS. 5B through 5E show a comparison of the bit error rate of a preferred embodiment system of the present invention.
Figure 5C:
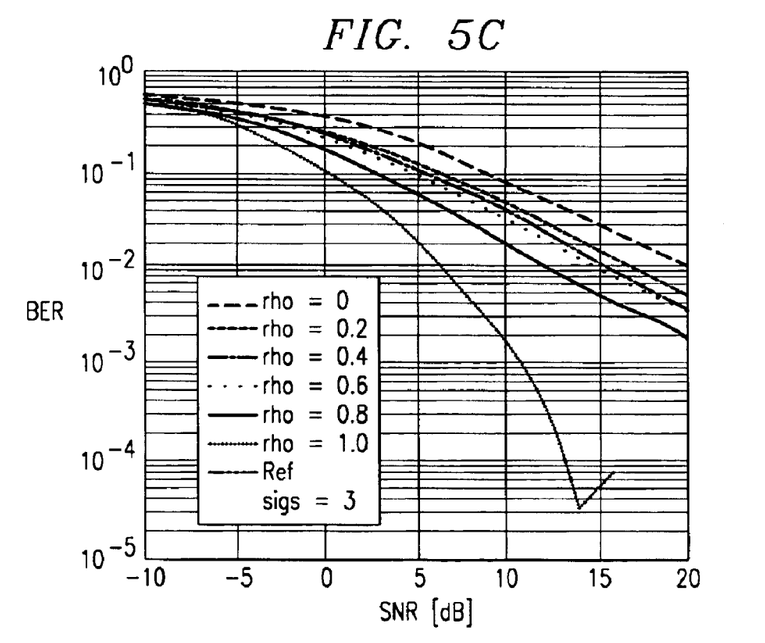
Figure 5D:
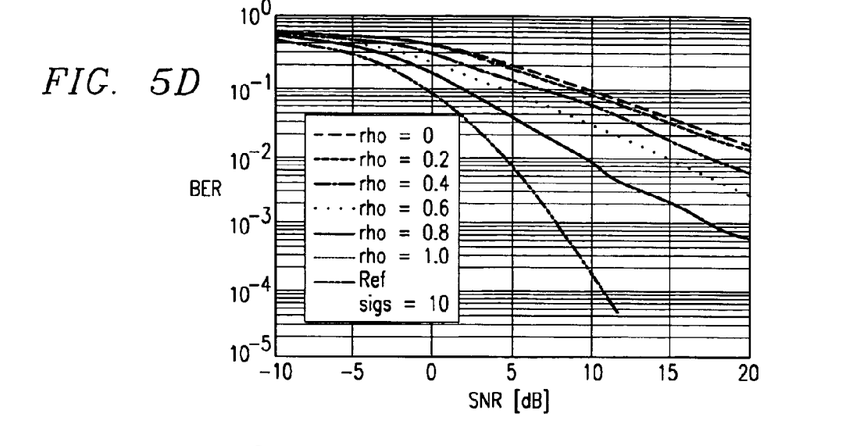
Figure 5E:
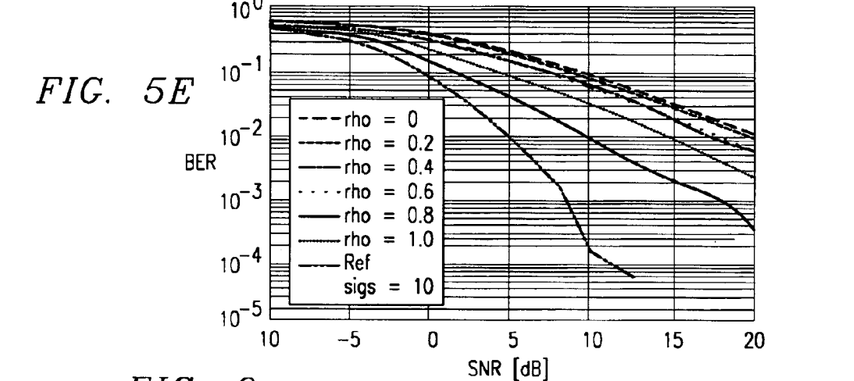

It should be appreciated that high data rate wireless applications require relatively high (relative to voice services) carrier to interference (C/I) conditions at the receiver input. Utilizing M sub-pilots, having in the aggregate substantially the same power as a single common pilot typically used, according to the preferred embodiment of present invention does not impair the ability to perform non-coherent combining, but instead improves this ability. Indeed, computer modeling confirms that the diversity provided through the use of a plurality of sub-pilots improves pilot detection performance over the use of a single common pilot as is generally the practice today. For high data rate communications the C/I after despreading should be more than approximately 10 dB. Each sub-pilot's C/I after de-spreading is at least 4 dB on average. Therefore, utilizing a plurality of sub-pilots provides the necessary C/I. Directing attention to FIGS. 4A (pilot detection performance for false alarm=0.01) and 4B (pilot detection performance for false alarm=0.1), pilot detection (Pd) for multiple sub-pilots (the curve intersecting the y axis at the lowest point in FIGS. 4A and 4B) compared to a single pilot (the curve intersecting the y axis at the highest point in FIGS. 4A and 4B) is graphed for various signal to noise ratios (SNR) showing approximately a 2 to 3 dB performance advantage over a single pilot.

According to the preferred embodiment, when tracking is established, spatial channel estimation can be performed. Referring again to FIG. 3, channel estimator 350 of the preferred embodiment subscriber unit may be implemented to provide spatial channel estimation. For example, channel estimator 350 may coherently integrate all sub-pilot samples, such as by using sub-pilot information provided by FHT unit 330, over a channel allowable coherent period. Channel estimator 350 may compensate for Doppler shift of channel frequency error, such as by multiplying data sample sequences by a harmonic function with several different periods, as is sometimes done for frequency recovery operations in wireless modems. Spatial channel estimation may be expedited by using channel estimation techniques as shown and described in the above referenced patent application entitled "Manifold Assisted Channel Estimation and Demodulation for CDMA Systems in Fast Fading Environments," previously incorporated herein by reference.

As discussed above, the spatial channel estimation information is preferably provided to the base station for use in forward link beam forming. Accordingly, the preferred embodiment adds the spatial signature as determined by channel estimator 350 to a reverse link control channel for transmission to the base station.

Spatial channel estimation information is also preferably used in performing demodulation at the subscriber unit according to the preferred embodiment to thereby cooperate with beam forming in the forward link in providing a receive signal having desired attributes. Specifically, the subscriber unit has information with respect to how the forward link beam is formed, e.g., the last channel estimates provided to the base station, the subscriber unit. This information may be utilized in determining a composite pilot which emulates a pilot transmitted in the narrow beam utilized by the traffic signal in the forward link by applying the conjugate of the forward link channel to the decoded sub-pilots received. Accordingly, in the preferred embodiment subscriber unit of FIG. 3, spatial channel estimation information, i.e., the spatial channel signature, determined by channel estimator 350 is provided to vector multiplier 360. Multiplier 360 preferably provides dot-product multiplication of the current spatial channel signature vector $C_k(t)$ and the transpose conjugate of the last spatial channel signature vector $C_k(t-\tau)$ provided to the base station, as represented by the equation:

$$P_k(t) = C_k(t-\tau)^H * C_k(t); \quad (5)$$

where $\tau$ is the measurement (and reporting) interval.

$P_k(t)$ may be utilized in demodulating the received data stream from a high order modulation scheme, such as phase shift keying (PSK) or quadrature amplitude modulation (QAM). Accordingly, in the preferred embodiment subscriber unit of FIG. 3, vector multiplier 360 provides result information ($P_k(t)$) to complex multiplier 370. Preferably, complex multiplier 370 demodulates symbols according to the following equation:

$$\text{Demodulated-symbol}_k(t) = P_k(t) * D_k(t); \quad (6)$$

where $D_k(t)$ is a data sample from the received data stream.

It should be appreciated that the demodulator reference $P_k(t)$ provides for better demodulation performance over that of a typical single common pilot due at least in part to diversity gains in its production. In order to evaluate the performance advantage provided by the above preferred embodiment, system operation was computer modeled for a system utilizing a linear array of 4 antenna elements with approximately a 10 wavelength aperture, having signal angle spread (sigs) from the base station's point of view in the range of 0 to 30 degrees, with Doppler rates in the range of 0 to 200 Hz, and feedback latency in the range of 1 to 4 msecs. FIGS. 5A through 5E show various results of this computer modeling. Specifically, FIG. 5A ("rho" function) shows correlation verses Doppler bandwidth of the modeled system. FIGS. 5B through 5E show a comparison of the bit error rate (BER), at different angular spreads (system performance for no angular spread in FIG. 5B, system performance for 3° angular spread in FIG. 5C, system performance for 10° angular spread in FIG. 5D, and system performance for 30° angular spread in FIG. 5E), of the modeled system verses that of a typical single pilot implementation. It should be appreciated that the time correlation function "rho" of FIGS. 5A through 5E is inversely related to correlation between consecutive coefficient estimations, such that the higher the Doppler rate, the lower is the "rho" for a given feedback latency.

From the graphs of FIGS. 5A through 5E it should be appreciated that for small angle spread, beam forming gain tends to be consistent in the simulated system of the present invention relative to that of a more traditional single antenna pilot system, independent of feedback latency. However, as angular spread increases, loss due to feedback delay increases, but high diversity gain provides or approximately an 8 to 15 dB advantage. Moreover, under no condition simulated does the system of the present invention provide a disadvantage relative to the more traditional single antenna pilot system.

Although the preferred embodiments described above have been discussed with reference to communicating spatial channel estimation information in the reverse links, it should be appreciated that capacity for such information feedback may not always be available in a wireless communication system. For example, extra reverse link capacity associated with the use of multiple reverse link beams as described above may be consumed by subscriber payload and, therefore, may not be available for forward link estimation information. Accordingly, alternative embodiments of the present invention may utilize beam forming techniques which do not rely upon feed back of forward link estimation information from subscriber units. However, it should be appreciated that such techniques typically will not provide information sufficient for the grouping of subscriber units for simultaneous communications as described above. Accordingly, such alternative embodiments may utilize a single transmission stream which is time divided among multiple subscribers, i.e., a time division forward link system.

Forward link beam forming may be provided using reverse link spatial channel information available at the base station. However, using reverse link estimation to determine forward link direction should take into account the fact that, if the two links do not utilize the same frequency (frequency division duplexing (FDD)) an accurate angle of departure generally cannot be obtained. Accordingly, wherein FDD is utilized, the forward link beam width should generally be sufficient to account for any error in accurate angle of departure estimation. Accordingly, forward link beam forming may be determined based upon such information as angular spread in the reverse link, the estimated distance of the subscriber unit from the base station, and the forward link frame error rate, such as is shown and described in the above referenced patent application entitled "Transmitting Beam Forming in Smart Antenna Array Systems," previously incorporated herein by reference. Using such beam forming techniques, it has been shown that for a cell radius of 2 Km the average forward link beam width is less than 30 degrees. Relative to a full 120 degree sector beam of a typical cellular system, the use of forward link antenna beams having a beam width of less than 30 degrees provides approximately a 6 dB gain advantage.

For a typical cellular sectorization scheme, where 3 sectors of 120 degrees each are provided in a cell, the probability of a subscriber unit being illuminated by another single-beam-per-sector antenna beam may be calculated using the following equations:

$$P1=2*(BW/120*(1-BW/120)); \quad (7)$$

$$P2=(BW/120)^2; \text{ and} \quad (8)$$

$$P3=1-P1-P2 \quad (9)$$

Where P1 is the probability of a subscriber unit being illuminated at a given time slot by a single beam of another cell, P2 is the probability of a subscriber unit being illuminated at a give time slot by two beams of other cells, P3 is the probability of a subscriber unit not being illuminated at a given time slot by beams of another cell, and BW is the beam width.

In a system where forward link transmission rates are determined by the probability that a subscriber unit will be illuminated by a single beam of another cell (equation 7 above), the system will experience an increased error rate corresponding to 3 dB C/I reduction for ½ of the transmission period and an increased error rate corresponding to 6 dB C/I reduction for $\frac{1}{16}$ of the transmission period. However, this embodiment provides a C/I advantage over systems not providing forward link beam forming as shown by the following equation:

$$\text{GAIN}=120/BW*1(1-P1-P2)+2*P1+0*P2 \quad (10)$$

Which in the case of 30 degree beams provides:

$$\text{GAIN}=120/30*1(1-\tfrac{6}{16}-\tfrac{1}{16})+2*\tfrac{6}{16}+\tfrac{1}{16}=3 \quad (11)$$

The gain associated with the use of beam widths of approximately 30 degrees in the forward link provides approximately a 4.77 dB gain advantage over the systems not providing forward link beam forming. However, to realize this gain, interference must be averaged. Averaging interference can be achieved by assuring quick time variations, i.e., forward link beams must be switched, and thus the corresponding served subscriber switched, at a period that is significantly shorter than the system interleave period. For example, where an interleave period of 20 msec is used, the forward link beams should be redirected in approximately 2 to 3 msecs. Assuming that many subscribers need to be served and that data latency is not critical, such a system can manage subscriber queues accordingly.

One example of a time division forward link system which may benefit from the application of forward link beam forming according to the present invention is the aforementioned HDR system. In the HDR system, each subscriber unit continuously informs the base station as to an acceptable data rate that the subscriber unit can receive based upon channel conditions, and the base station reacts accordingly. The subscriber units estimate the sustainable data rate using a system pilot which must continuously cover all areas of operation.

Implementing forward link beam forming according to the present invention in such a system preferably includes transmitting a pilot signal through a full sector beam, such as a 120 degree sector beam. Preferably the reverse link is utilized to estimate the forward link direction, the subscriber unit's distance from the base station, and/or the transmit angle spread. A subscriber unit queue is preferably arranged based upon quality of service criteria and current latency. Preferably, subscribers with similar queue priority are interleaved for forward link communication. In providing forward link communications, the preferred embodiment will not continuously serve a subscriber for a period that is longer than approximately one tenth ($\frac{1}{10}$) of the interleave period in order to provide the above described interference averaging.

To enable forward link beam forming according to this embodiment, a dedicated pilot (similar to that of the 3G-cdma2000 implementation) is preferably used. This dedicated pilot preferably replaces the common pilot for use in demodulation of high order modulation techniques, such as PSK or QAM. In order to provide proper phase information for such demodulation, the dedicated pilot of this embodiment is preferably beam formed together with the traffic channel. In a preferred embodiment the dedicated pilot is code multiplexed over the common pilot using a Walsh code that is different than that used for the common pilot. Although the use of such a dedicated pilot consumes a significant amount of capacity, the net result of its use according to the present invention is a significant capacity increase.

Figure 6:
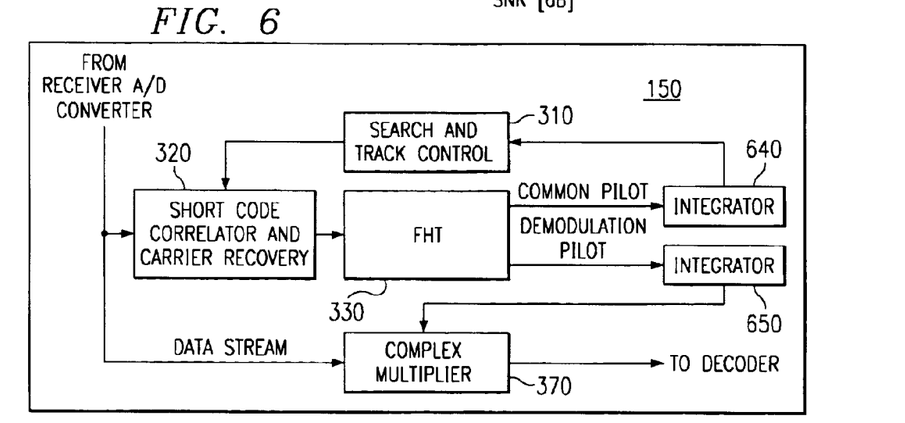
FIG. 6 shows a subscriber unit adapted to operate with forward link beam forming according to an alternative embodiment of the present invention.

Directing attention to FIG. 6, a block diagram of circuitry of subscriber unit 150 adapted to provide time division forward link beam forming according to a preferred embodiment of the present invention is shown. As discussed with respect to FIG. 3, FHT unit 330 of the preferred embodiment separates the pilot signals. However, in the embodiment of FIG. 6, FHT unit 330 separates the common pilot and the demodulation pilot rather than the sub-pilots of the embodiment of FIG. 3. The common pilot information, provided by integrator 640 in the illustrated embodiment, is used for search and track control as is typical for such systems. However, the dedicated pilot information, as provided by integrator 650 in the illustrated embodiment, is used for demodulation of the received data stream.

Alternative embodiments of the present invention may introduce phase matching at the subscriber unit such as shown and described in the above referenced patent applications entitled "Practical Space-Time Radio Method for CDMA Communication Capacity Enhancement" and "Methods of Phase Recovery in Cellular Communication Systems," the disclosures of which have been incorporated herein by reference. In such embodiments the use of a dedicated pilot may be omitted, as the common pilot is phase matched to the traffic channel transmitted on the narrow beam and, therefore, is suitable for use in demodulating the traffic signal.

Preferred embodiments of the present invention have been described herein with reference to a cellular wireless communication network to aid in the understanding of the concepts of the present invention. However, it should be appreciated that the present invention may be utilized with any number of wireless communication systems, irrespective of whether they are deployed in a cellular network.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A wireless communication system providing adaptive beam forming in a transmit signal path, said system comprising:

an array of antenna elements, wherein said array includes at least M spaced apart antenna elements;

signal transmission circuitry providing M orthogonal renditions of a first signal, wherein said signal transmission circuitry is coupled to said M spaced apart antenna elements to provide a different one of said M orthogonal renditions of said first signal to each of said M spaced apart antenna elements for radiation in said transmit signal path;

signal reception circuitry providing discrete information with respect to each one of said M orthogonal renditions of said first signal as determined from a composite receive signal of said M orthogonal renditions of said first signal;

channel estimator circuitry coupled to said signal reception circuitry and receiving said discrete information with respect to each one of said M orthogonal renditions of said first signal, wherein said channel estimator circuitry determines a spatial signature associated with said composite receive signal; and beam forming circuitry providing beam forming coefficients to be used in transmission of a second signal, wherein said beam forming coefficients are determined as a function of a conjugate of said spatial signature.

2. The system of claim 1, wherein at least one of said M spaced apart antenna elements comprises a column of antenna elements.

3. The system of claim 1, wherein said array of antenna elements comprises a planar phased array.

4. The system of claim 1, wherein said array of antenna elements comprises a circular phased array.

5. The system of claim 1, wherein M is 4.

6. The system of claim 5, wherein said 4 spaced apart antenna elements provide an antenna aperture of approximately 10 wavelengths.

7. The system of claim 1, wherein said first signal is a pilot signal.

8. The system of claim 7, wherein said pilot signal provides demodulation information for said second signal.

9. The system of claim 8, further comprising:

pilot signal beam forming emulation circuitry coupled to said channel estimator circuitry, wherein said pilot signal beam forming emulation circuitry utilizes said spatial signature in combination with said discrete information with respect to each one of said M orthogonal renditions of said first signal to emulate said first signal having been transmitted using said beam forming coefficients, wherein said emulated first signal is utilized in demodulating said second signal.

10. The system of claim 1, wherein said orthogonal renditions of said first signal are derived from power dividing said first signal M ways and separately coding each of said M power divided first signals.

11. The system of claim 10, wherein codes used in separately coding said M power divided first signals are orthogonal pseudo noise codes.

12. The system of claim 11, wherein said pseudo noise codes are Walsh codes.

13. The system of claim 1, wherein said signal transmission circuitry provides said second signal to each of said M spaced apart antenna elements in signal components weighted according to said beam forming coefficients.

14. The system of claim 13, wherein said first signal is provided to said M spaced apart antenna elements without beam forming processing and said second signal is provided to said M spaced apart antenna elements with beam forming processing.

15. The system of claim 1, wherein said discrete information with respect to each one of said M orthogonal renditions of said first signal comprises power and phase information.

16. The system of claim 1, wherein said discrete information with respect to each one of said M orthogonal renditions of said first signal is utilized by said channel estimator to provide M dimensional column vectors describing said spatial signature.

17. The system of claim 16, wherein said beam former circuitry receives spatial signature information from N channel estimators and utilizes this spatial signature information to derive N*M dimensional column vectors.

18. The system of claim 17, wherein said N*M dimensional column vectors are utilized to group subscriber units associated with said N channel estimators according to subscriber units which may receive simultaneous transmissions without substantial interference.

19. The system of claim 1, wherein said spatial signature includes a channel quality metric.

20. The system of claim 19, wherein said channel quality metric estimates C/I and Doppler conditions of the channel.

21. The system of claim 19, wherein said channel quality metric is determined at least in part using a time correlation function.

22. The system of claim 21, wherein said time correlation function comprises the equation $Y_k = C_k(t)^{H*} C_k(t-\tau)/(abs(C_k(t)) * abs(C_k(t+\tau)))$.

23. The system of claim 1, further comprising:

receiver grouping logic, wherein said spatial signature is utilized by said receiver grouping logic to group ones of a plurality of receivers, one of which is associated with said spatial signature, to identify ones of said receivers which may receive simultaneous transmissions without causing substantial interference.

24. The system of claim 23, wherein identification of said receivers which may receive simultaneous transmissions is provided through logic such that if $abs(C_1^{H*} C_2)/(abs(C_1) * abs(C_2)) < Q$, then $C_1$ and $C_2$ are identified with different groups, and if $abs(C_1^{H*} C_2)/(abs(C_1) * abs(C_2)) >= Q$, then $C_1$ and $C_2$ are identified with the same group.

25. The system of claim 1, further comprising:

data rate determining logic, wherein a data rate utilized in transmission of said second signal is determined by said data rate determining logic as a function of channel quality information associated with said spatial signature.

26. The system of claim 25, wherein said spatial signature includes a channel condition metric Yk and said data rate is determined at least in part using the equation $(Data\text{-}rate)_k = R_k + L * abs(Y_k)$.

27. The system of claim 1, wherein said array of antenna elements, said signal transmission circuitry, and said beam forming circuitry are disposed at a base station location, and wherein said signal reception circuitry and said channel estimator circuitry are disposed at a subscriber unit location.

28. The system of claim 27, wherein said base station is a cellular base transceiver station.

29. The system of claim 27, wherein said base station utilizes a CDMA air interface.

30. The system of claim 27, wherein said base station utilizes a TDMA air interface.

* * * * *